United States Patent
Bertram et al.

(10) Patent No.: US 10,032,111 B1
(45) Date of Patent: Jul. 24, 2018

(54) SYSTEMS AND METHODS FOR MACHINE LEARNING OF PILOT BEHAVIOR

(71) Applicant: Rockwell Collins, Inc., Cedar Rapids, IA (US)

(72) Inventors: Joshua R. Bertram, Ames, IA (US); Angus L. McLean, Bradenton, FL (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 0 days.

(21) Appl. No.: 15/435,197

(22) Filed: Feb. 16, 2017

(51) Int. Cl.
| | |
|---|---|
| *G06N 3/08* | (2006.01) |
| *G06N 3/10* | (2006.01) |
| *G06N 99/00* | (2010.01) |
| *B64C 13/18* | (2006.01) |
| *G05D 1/00* | (2006.01) |
| *G05D 1/10* | (2006.01) |
| *G09B 9/00* | (2006.01) |
| *G09B 9/052* | (2006.01) |
| *G09B 9/16* | (2006.01) |

(52) U.S. Cl.
CPC .............. *G06N 3/08* (2013.01); *B64C 13/18* (2013.01); *G05D 1/0088* (2013.01); *G05D 1/101* (2013.01); *G06N 3/10* (2013.01); *G06N 99/005* (2013.01); *G09B 9/003* (2013.01); *G09B 9/052* (2013.01); *G09B 9/16* (2013.01)

(58) Field of Classification Search
CPC .......... G06N 3/08; G06N 3/10; G06N 99/005; B64C 13/18; G05D 1/0088; G05D 1/101; G09B 9/003; G09B 9/052; G09B 9/16
See application file for complete search history.

(56) References Cited

U.S. PATENT DOCUMENTS

| | | | |
|---|---|---|---|
| 6,360,193 B1* | 3/2002 | Stoyen | G09B 9/003 703/17 |
| 7,330,844 B2* | 2/2008 | Stoyen | G09B 9/003 342/195 |
| 2006/0225710 A1* | 10/2006 | Taglialatela-Scafati | F02D 35/023 123/486 |
| 2017/0369052 A1* | 12/2017 | Nagy | B60W 30/09 |

OTHER PUBLICATIONS

Gunsch et al, On Applying Machine Learning to Develop Air Combat Simulation Agents, 4th Annual Conference on AI, Simulation and Planning in High Autonomy Systems, IEEE, 1993, pp. 67-73.*

* cited by examiner

*Primary Examiner* — Russell Frejd
(74) *Attorney, Agent, or Firm* — Donna P. Suchy; Daniel M. Barbieri

(57) ABSTRACT

A system includes a machine learning engine. The machine learning engine is configured to receive training data including a plurality of first input conditions and a plurality of first response maneuvers associated with the first input conditions. The machine learning engine is configured to train a learning system using the training data to generate a second response maneuver based on a second input condition.

18 Claims, 10 Drawing Sheets

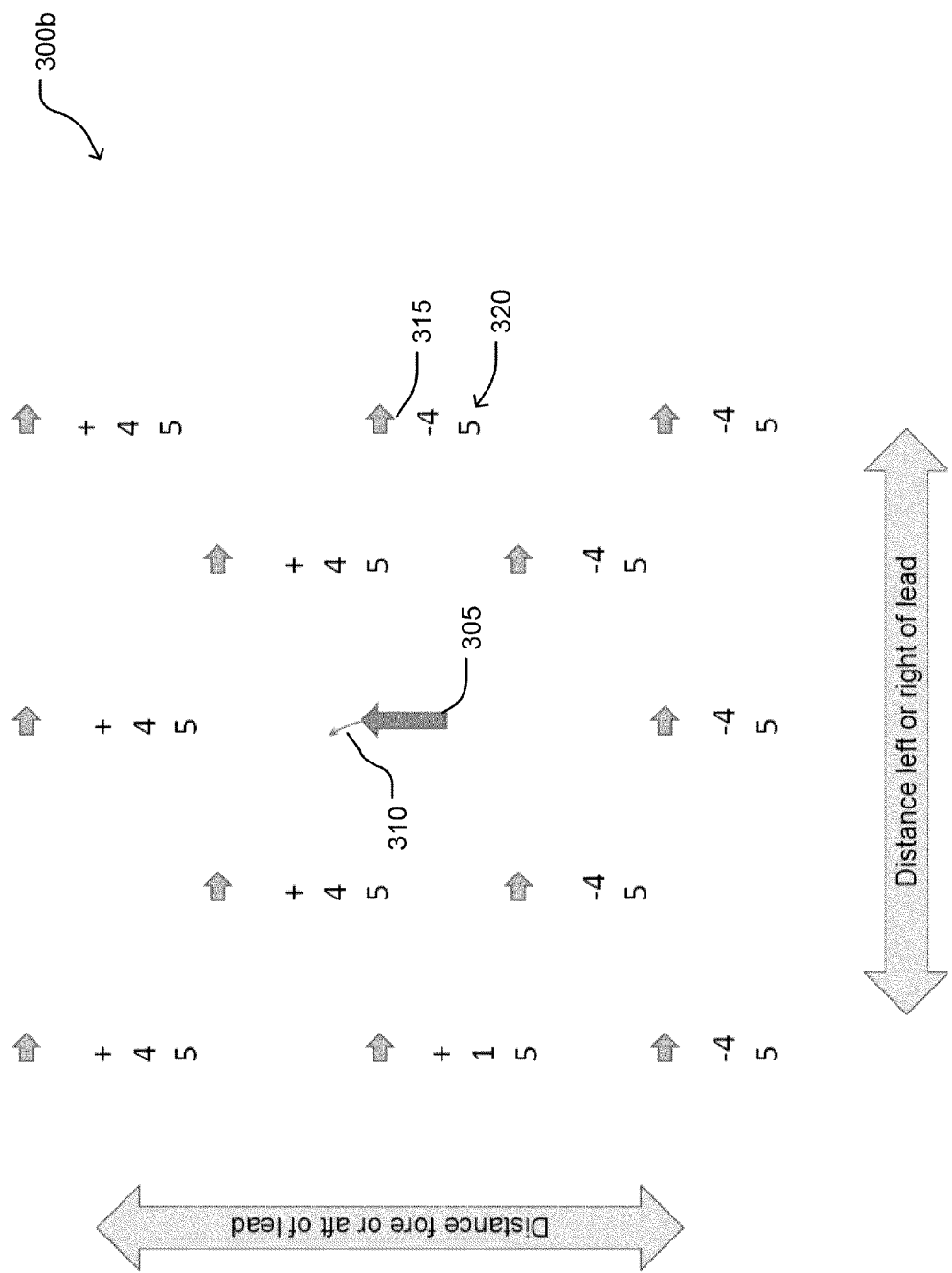

SYSTEMS AND METHODS FOR MACHINE LEARNING OF PILOT BEHAVIOR

BACKGROUND

The inventive concepts disclosed herein relate generally to the field of avionics systems. More particularly, embodiments of the inventive concepts disclosed herein relate to systems and methods for machine learning of pilot behavior, such as for operating autonomous vehicles.

Autonomous vehicles, including unmanned aircraft, can perform maneuvers based on instructions that may be received from a remote human operator or, in the case of fully autonomous vehicles, instructions that are generated based on control laws that may be based on optimizing a particular objective. However, autonomous vehicles may not be able to receive instructions from a remote human operator at a conceptual level that is easy for the remote human operator to understand and thus communicate efficiently with the autonomous vehicle. Similarly, fully autonomous vehicles may generate instructions resulting in maneuvers that are inconsistent with expected pilot behavior, which may confuse other nearby vehicles or human operators working with the autonomous vehicles during training or testing exercises.

SUMMARY

In one aspect, the inventive concepts disclosed herein are directed to a system. The system includes a machine learning engine. The machine learning engine is configured to receive training data including a plurality of first input conditions and a plurality of first response maneuvers associated with the first input conditions. The machine learning engine is configured to train a learning system using the training data to generate a second response maneuver based on a second input condition.

In a further aspect, the inventive concepts disclosed herein are directed to a vehicle. The vehicle includes a first interface, a second interface, and a control circuit. The first interface is configured to receive an input condition. The second interface is configured to receive a control instruction indicating a maneuver command. The control circuit includes a machine learning engine, and is configured to provide the input condition and control instruction to the machine learning engine. The machine learning engine is configured to output a response maneuver based on the input condition and the control instruction. The control circuit is configured to control operation of the vehicle based on the response maneuver.

In a further aspect, the inventive concepts disclosed herein are directed a system. The system includes a simulation engine and a control circuit. The simulation engine is configured to generate a representation of an environment based on a model of the environment. The control circuit is configured to receive an input condition, receive the representation of the environment from the simulation engine, generate a response maneuver based on at least one of the input condition or the representation of the environment, and output an indication of the response maneuver to the simulation engine to cause the simulation engine to update the representation of the environment.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIGS. 3A-3D are schematic diagrams of exemplary embodiments of training cases used for machine learning of pilot behavior according to the inventive concepts disclosed herein;

DETAILED DESCRIPTION

Figure 1:
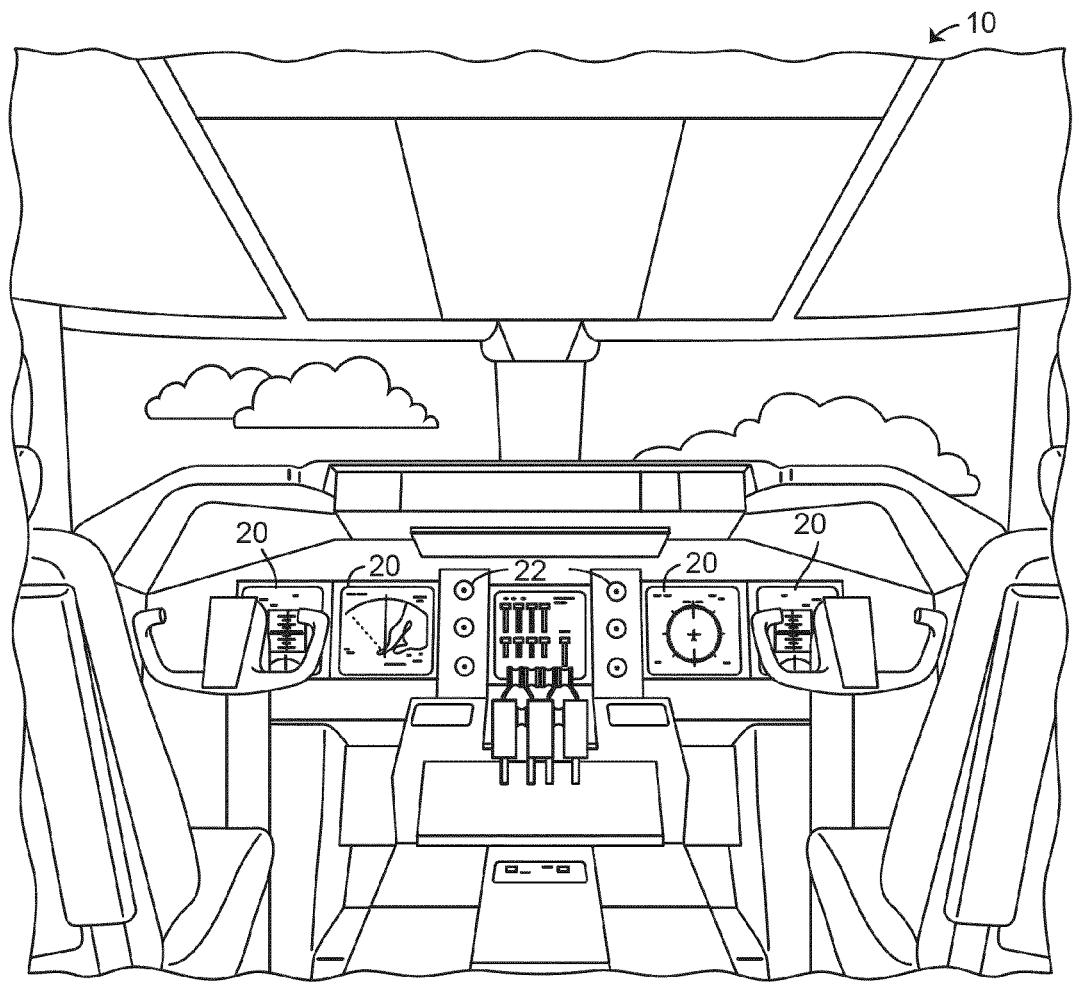
FIG. 1 is a schematic illustration of an exemplary embodiment of an aircraft control center according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following:

A is true (or present) and B is false (or not present), A is false (or not present) and B is true (or present), or both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to systems and methods for machine learning of pilot behavior. The inventive concepts disclosed herein can be utilized in a number of control systems for various types of electronic avionics applications for airborne platforms (e.g., aircraft), including but not limited to flight control and autopilot systems, navigation systems, flight display systems, communications systems, radar systems, electric power systems, engine control systems, and monitor warning systems. While the present disclosure describes systems and methods implementable for an airborne platform, the inventive concepts disclosed herein may be used in any type of application or environment (e.g., in another aircraft, a spacecraft, an autonomous vehicle, a ground-based vehicle, a water-based or underwater vehicle, a subsurface or subterranean vehicle, a satellite, an aeronautical platform, or in a non-vehicle application such as a stationary communications, sensing, or testing system, a ground-based display system, an air traffic control system, a radar system, a virtual display system). The inventive concepts disclosed herein may be used for training, simulation, and testing exercises to be performed with autonomous vehicles, including during development of autonomous vehicles.

In some embodiments, a system includes a machine learning engine. The machine learning engine is configured to receive training data including a plurality of first input conditions and a plurality of first response maneuvers associated with the first input conditions. The machine learning engine is configured to train a learning system using the training data to generate a second response maneuver based on a second input condition.

The system can be integrated with an airborne platform or other platform as described herein. For example, the system can be included in or communicatively coupled to an avionics system, navigation system, or autopilot system of the airborne platform, including for controlling operation of unmanned vehicles and autonomous vehicles.

In some embodiments, systems manufactured in accordance with the inventive concepts disclosed herein can improve the operation of autonomous vehicles by enabling a shared mental model of pilot behavior between human pilots and autonomous vehicles. For example, by training a learning system to learn how human pilots respond to various conditions, such as commands and flight conditions associated with positional relationships between aircraft, autonomous vehicles can be improved to perform flight maneuvers in a manner consistent with how human pilots would respond to such conditions. Unlike existing methods for maneuvering autonomous vehicles, such as by following a control law that optimizes a variable such as a distance from a leader aircraft at the expense of performing a maneuver that a human pilot would readily understand and be able to react to, the inventive concepts disclosed herein may allow autonomous vehicles to execute maneuvers (e.g., "follow the leader") which cannot be reduced to a control law while also performed in a manner than can be understood by a human pilot. Similarly, systems manufactured according to embodiments of the inventive concepts disclosed herein can enable autonomous vehicles to interact with human pilots and actors at a high level of sophistication unavailable to existing autopilot systems.

Referring to FIG. 1, a perspective view schematic illustration of an aircraft control center or cockpit 10 is shown accordingly to an exemplary embodiment of the inventive concepts disclosed herein. The aircraft control center 10 can be configured for an aircraft operator or other user to interact with avionics systems of an airborne platform. The aircraft control center 10 may include one or more flight displays 20 and one or more user interface ("UI") elements 22. The flight displays 20 may be implemented using any of a variety of display technologies, including CRT, LCD, organic LED, dot matrix display, and others. The flight displays 20 may be navigation (NAV) displays, primary flight displays, electronic flight bag displays, tablets such as iPad® computers manufactured by Apple, Inc. or tablet computers, synthetic vision system displays, head up displays (HUDs) with or without a projector, wearable displays, watches, Google Glass®. The flight displays 20 may be used to provide information to the flight crew, thereby increasing visual range and enhancing decision-making abilities. One or more of the flight displays 20 may be configured to function as, for example, a primary flight display (PFD) used to display altitude, airspeed, vertical speed, and navigation and traffic collision avoidance system (TCAS) advisories. One or more of the flight displays 20 may also be configured to function as, for example, a multi-function display used to display navigation maps, weather radar, electronic charts, TCAS traffic, aircraft maintenance data and electronic checklists, manuals, and procedures. One or more of the flight displays 20 may also be configured to function as, for example, an engine indicating and crew-alerting system (EICAS) display used to display critical engine and system status data. Other types and functions of the flight displays 20 are contemplated as well. According to various exemplary embodiments of the inventive concepts disclosed herein, at least one of the flight displays 20 may be configured to display a visual representation of a widget generated according to the systems and methods of the inventive concepts disclosed herein.

In some embodiments, the flight displays 20 may provide an output based on data received from a system external to an aircraft, such as a ground-based weather radar system, satellite-based system, or from a system of another aircraft. In some embodiments, the flight displays 20 may provide an output from an onboard aircraft-based weather radar system, LIDAR system, infrared system or other system on an aircraft. For example, the flight displays 20 may include a weather display, a weather radar map, and a terrain display. In some embodiments, the flight displays 20 may provide an output based on a combination of data received from multiple external systems or from at least one external system and an onboard aircraft-based system. The flight displays 20 may include an electronic display or a synthetic vision system (SVS). For example, the flight displays 20 may include a display configured to display a two-dimensional (2-D) image, a three dimensional (3-D) perspective image of terrain and/or weather information, or a four dimensional (4-D) display of weather information or forecast information. Other views of terrain and/or weather information may also be provided (e.g., plan view, horizontal view, vertical view). The views may include monochrome or color graphical representations of the terrain and/or weather information. Graphical representations of weather or terrain may include an indication of altitude of the weather or terrain or the altitude relative to an aircraft.

The UI elements 22 may include, for example, dials, switches, buttons, touch screens, keyboards, a mouse, joysticks, cursor control devices (CCDs), menus on Multi-Functional Displays (MFDs), or other multi-function key pads certified for use with avionics systems. The UI elements may be incorporated by the flight displays 20 (e.g., the UI elements 22 may appear on or be part of the flight displays 20). The UI elements 22 may be configured to, for example, allow an aircraft crew member to interact with various avionics applications and perform functions such as data entry, manipulation of navigation maps, and moving among and selecting checklist items. For example, the UI elements 22 may be used to adjust features of the flight displays 20, such as contrast, brightness, width, and length. The UI elements 22 may also (or alternatively) be used by an aircraft crew member to interface with or manipulate the displays of the flight displays 20. For example, the UI elements 22 may be used by aircraft crew members to adjust the brightness, contrast, and information displayed on the flight displays 20. The UI elements 22 may additionally be used to acknowledge or dismiss an indicator provided by the flight displays 20. The UI elements 22 may be used to correct errors on the flight displays 20. The UI elements 22 may also be used to adjust the radar antenna tilt, radar display gain, and to select vertical sweep azimuths. Other UI elements 22, such as indicator lights, displays, display elements, and audio alerting devices, may be configured to warn of potentially threatening conditions such as severe weather, terrain, and obstacles, such as potential collisions with other aircraft. In some embodiments, such as where an autonomous vehicle includes the cockpit 10, the cockpit 10 may be used to implement the autonomous vehicle as a piloted vehicle, or the autonomous vehicle components may be used as a backup system if the piloted portion of the vehicle is degraded or disabled. In some embodiments, such as for a hardware-in-the-loop test in which autonomous vehicle hardware is configured to display test information and receive inputs from a pilot or other user via components of the cockpit 10.

Figure 2A:
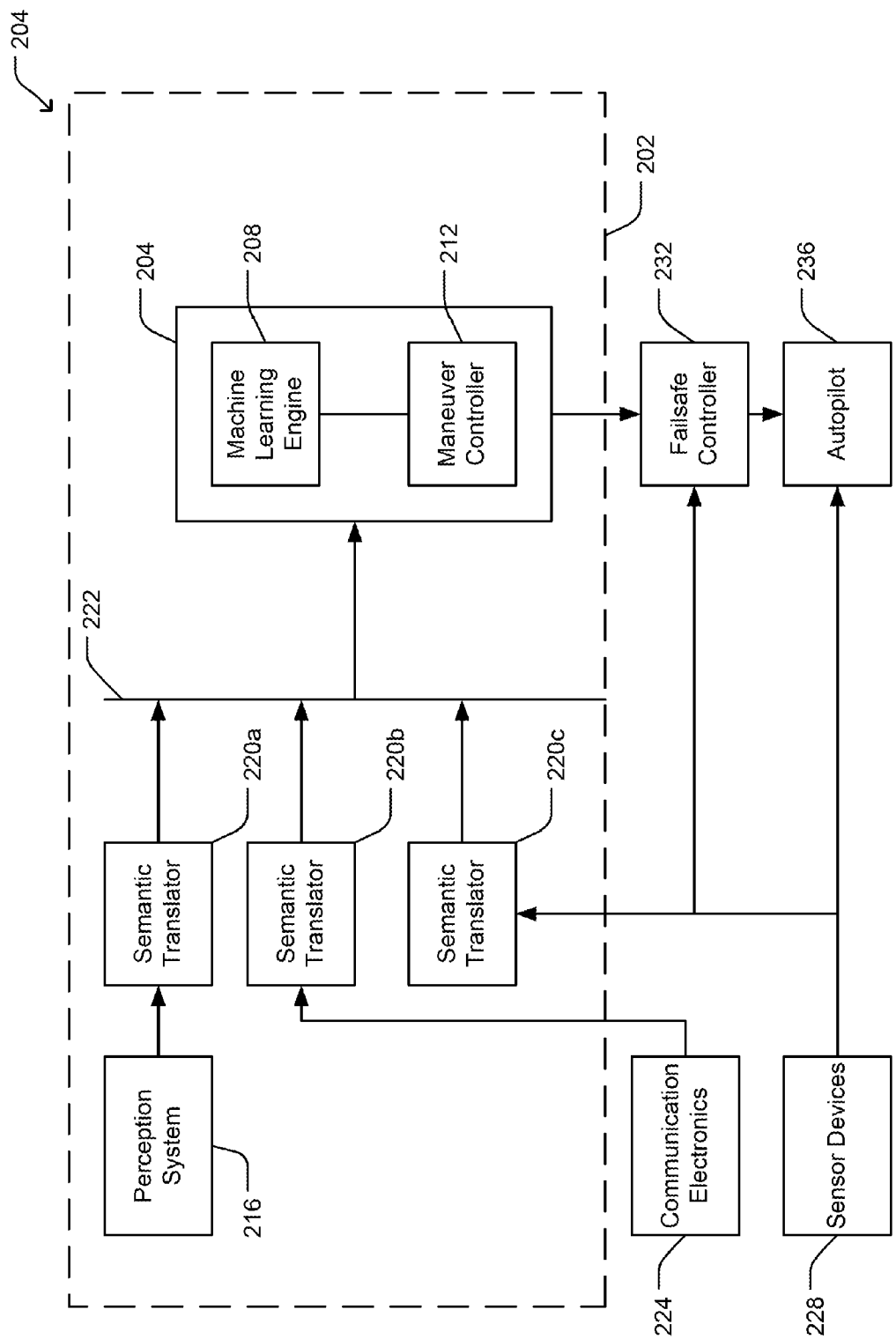
FIG. 2A is a block diagram of an exemplary embodiment of a system for machine learning of pilot behavior according to the inventive concepts disclosed herein.

Referring now to FIG. 2A, a schematic diagram of a system 200 is shown according to an exemplary embodiment of the inventive concepts disclosed herein. The system 200 can be implemented as part of a vehicle, an autonomous vehicle, or any other platform, such as an airborne platform incorporating features of the aircraft control center 10 of FIG. 1. The system 200 (or components thereof) can be implemented on a live platform, a simulation of a platform, a test exercise, or a hardware-in-the-loop application.

In some embodiments, the system 200 includes a control circuit 204. The control circuit 204 can generate instructions, commands, or other information that can be used to control operation of a vehicle (or control systems of a vehicle). The control circuit 204 includes a machine learning engine 208 and a maneuver controller 212. In some embodiments, the control circuit 204 includes or is coupled to a supervisory controller. The supervisory controller can be configured to synthesize control instructions generated by the maneuver controller 212 with other controllers or information, such as a controller based on a control law, or information received from a navigation system or sensor system.

Figure 2B:
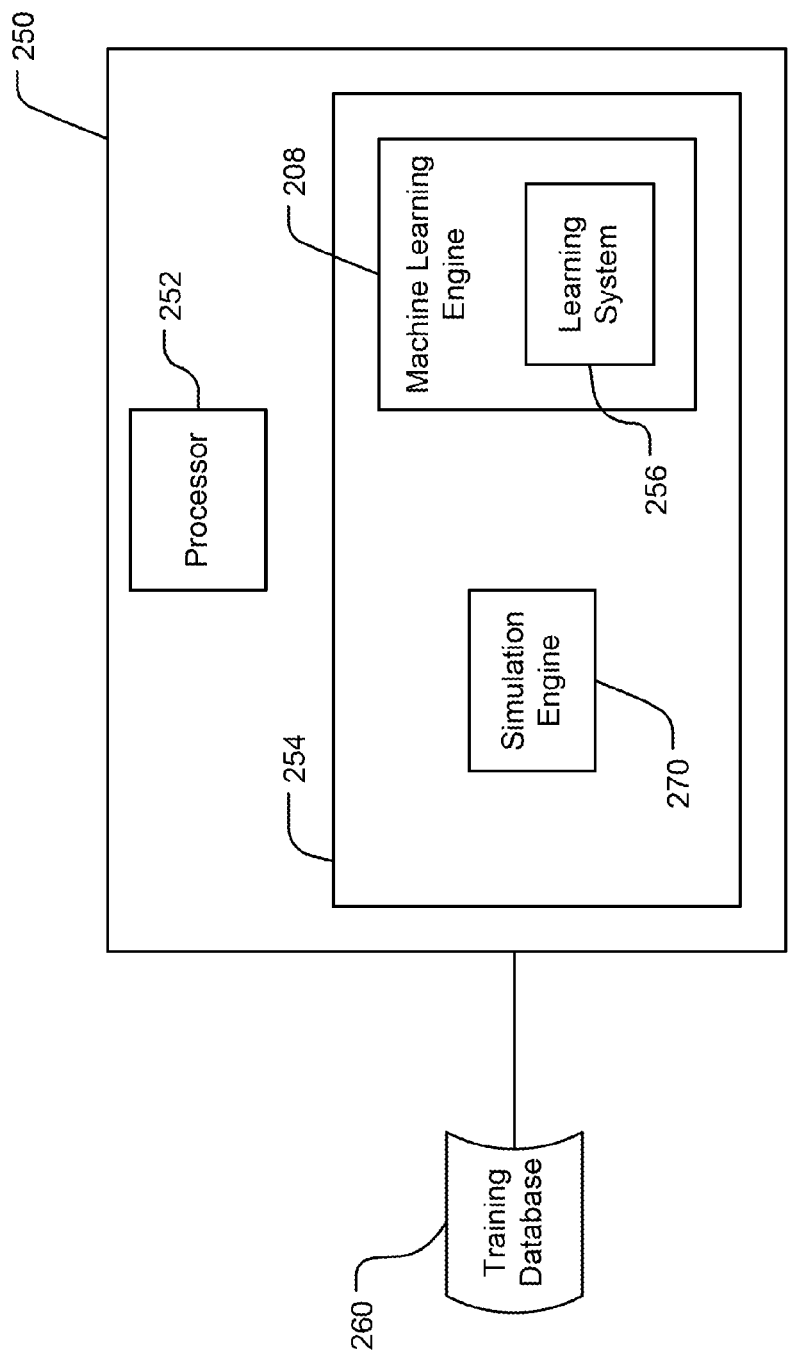
FIG. 2B is a block diagram illustrating implementation of an exemplary embodiment of a processing circuit for machine learning of pilot behavior according to the inventive concepts disclosed herein.

The machine learning engine 208 is configured to train the maneuver controller 212 to control operation of the vehicle in response to an input condition, where the input condition may include at least one of a command received from a human pilot at a semantic level of understanding, a state of the vehicle, or a state or representation of an environment surrounding the vehicle. The machine learning engine 208 can train the maneuver controller 212, or train a learning system (e.g., learning system 256 as shown in FIG. 2B), based on historical training data associating input conditions with vehicle responses, such as maneuvers performed by the vehicle responsive to controls from a human pilot. By encoding response maneuvers at an appropriate level of semantic granularity, autonomous vehicles can be enabled to communicate with and receive commands from human pilots at a much higher level than in existing systems, such that autonomous vehicles and human pilots can have a shared mental model of vehicle behavior and control.

In some embodiments, the machine learning engine 208 is configured to train the maneuver controller 212 (or the learning system 256) to generate a behavior model, such as a pilot behavior model, a semantic model, or a mental model, which can be shared with or readily understood by a human operator. For example, when trained, the maneuver controller 212 can be configured to receive commands at a semantic level of understanding from a human pilot. The semantic level of understanding may include high level or abstract commands, such as "follow the lead," "perform a join up with lead," or "land in that region." Based on the commands received at the semantic level of understanding, the maneuver controller 212 can determine an appropriate maneuver to perform to follow the command. The appropriate maneuver can be similar to a maneuver that would be performed by a human pilot under similar conditions or circumstances. In some embodiments, where the maneuver controller 212 is controlling a vehicle in a real world application such as live flight, the behavior of the vehicle may thus be readily understood by nearby human pilots. In some embodiments, where the maneuver controller 212 is controlling a vehicle in a testing, simulation, or development environment, the behavior of the vehicle may thus be readily understood to facilitate determine whether the vehicle is performing in a desired manner or demonstrating aberrant or faulty behavior.

Referring now to FIG. 2B, a schematic diagram of a processing circuit 250 is shown according to an exemplary embodiment of the inventive concepts disclosed herein. The processing circuit 250 can be used to implement various embodiments of the inventive concepts disclosed herein, including features of the system 200 described with reference to FIG. 2A. In some embodiments, the processing circuit 250 is configured to train a learning system 256 using the machine learning engine 208, or to enable a hardware-in-the-loop implementation using the machine learning engine 208 and a simulation engine 270.

The processing circuit 250 (e.g., control circuit, processing electronics) can include a processor 252 and memory 254. The processor 252 may be implemented as a specific purpose processor, an application specific integrated circuit (ASIC), one or more field programmable gate arrays (FPGAs), a group of processing components, or other suitable electronic processing components. The memory 254 is one or more devices (e.g., RAM, ROM, flash memory, hard disk storage) for storing data and computer code for completing and facilitating the various user or client processes, layers, and modules described in the present disclosure. The memory 254 may be or include volatile memory or non-volatile memory and may include database components, object code components, script components, or any other type of information structure for supporting the various activities and information structures of the inventive concepts disclosed herein. The memory 254 is communicably connected to the processor 252 and includes computer code or instruction modules for executing one or more processes described herein. The memory 254 includes various circuits, software engines, and/or modules that cause the processor 252 to execute the systems and methods described herein. Electronic hardware similar to the processor 252 and memory 254 may also be used to implement various components not shown in FIG. 2B.

In some embodiments, the memory 254 includes the machine learning engine 208. The machine learning engine 208 is configured to receive training data (e.g., flight data) including a plurality of first input conditions and a plurality of first response maneuvers associated with the first input conditions. The first input conditions can represent conditions which, when applied to a vehicle or when perceived by a pilot, lead to a particular response maneuver being performed. The conditions can include a state of a vehicle, a representation or state of an environment surrounding a vehicle, including behavior of other vehicles or platforms, and commands, instructions, or other communications received from other entities. In some embodiments, training components such as the machine learning engine 208, the learning system 256, or the maneuver controller 212 includes enabling such components to learn how to generate human-like vehicle behavior by learning how human pilots respond to input conditions.

The first input conditions can include an indication of a maneuver command. A maneuver command can be a command, instruction, or other information associated with a maneuver that the vehicle is expected, desired, or required to perform. A maneuver command can vary in specificity from an exact path along which the vehicle is required to travel to a general objective, such as a destination position and orientation that the vehicle is expected to reach.

In some embodiments, the machine learning engine 208 can be configured to determine the indication of the maneuver command based on other input conditions such as an entity state or behavior of other platforms. For example, rather than the training data including an explicit maneuver command, the input conditions may indicate a distance of a follower platform from a lead platform. The machine learning engine 208 can train the maneuver command 212 or learning system 256 to learn that the appropriate response maneuver when the lead platform is "too far" is to "accelerate to catch up according to a learned acceleration profile." Unlike existing systems, which might implement a control law such as to maintain a distance from a lead platform (and which may result in vehicle behavior inconsistent with or lacking the sophistication of a vehicle controlled by a human pilot) the machine learning engine 208 can train the maneuver controller 212 or learning system 256 to generate a sophisticated response maneuver that may be far too complex to capture with a control law.

The indication of the maneuver command can include at least one of an audio command, a visual command, a text command, or a command received via a datalink. For example, the maneuver command may be to "perform an overhead joinup." In some embodiments, where the indication of the maneuver command includes an audio command, the machine learning engine 208 can be configured to receive the maneuver command as audio data, such as a transmission or recording of human speech stating, "perform an overhead joinup." In some embodiments, where the indication of the maneuver command includes a text command, the machine learning engine 208 can be configured to receive the maneuver command as text data, such as a transmission of a file include text data which can indicate the phrase "perform an overhead joinup."

In some embodiments, the visual command includes at least one of a hand gesture, a movement of a platform, or an electromagnetic transmission from a platform. For example, the indication of the visual command may be a transmission or recording including video data depicting a hand gesture, a movement of a platform, or an electromagnetic transmission from a platform. The movement of the platform may be a shift in position or orientation of the platform, such as a wobbling of wings. The electromagnetic transmission may include information encoded as light of one or more wavelengths, such as a pulse or a plurality of pulses of light. The light may be of infrared, visible, ultraviolet, or other spectra of light.

The first input conditions can include an entity state. The entity state can include at least one of a position, a velocity, an acceleration, or an orientation. For example, the entity state can include a position and orientation of an airborne platform. In some embodiments, the machine learning engine 208 receives the entity state as data in a format associated with position, velocity, acceleration, or orientation. For example, the entity state data may indicate GPS coordinates of a vehicle, an airspeed or groundspeed of the vehicle, and a heading of the vehicle. In some embodiments, the machine learning engine 208 is configured to convert the entity state to a format associated with position, velocity, acceleration, or orientation, such as by receiving the entity state as a measure of thrust applied at a point in time and calculating acceleration based on the measure of thrust.

The entity state can include at least one of absolute information or relative information. For example, the entity state can indicate that the vehicle is located at absolute GPS coordinates. The entity state can indicate that the vehicle has an orientation such that the vehicle is travelling along a particular heading, such as "north." The entity state can also indicate a relative orientation or relative heading of the vehicle relative to a remote vehicle or platform. For example, the entity state can indicate that the vehicle is travelling in a direction that is 15 degrees eastward of a heading or orientation of the remote vehicle or platform.

The training data can be received from a training database 260 storing the training data. The training database 260 can store training data received based on data captured from control of a vehicle by a human pilot, such as from a simulation of controlling the vehicle or from real flight data. The plurality of first response maneuvers can be associated in the training database 260 with the first input conditions. For example, the training database 260 can map first input conditions to first response maneuvers. In some embodiments, more than one first input condition can be associated with a particular first response maneuver. For example, the particular maneuver may have been performed under a variety of first input conditions.

In some embodiments, the training data includes maneuver data. The maneuver data can represent a series of entity states over time. For example, the maneuver data can represent positions and/or orientations over the course of a maneuver. The maneuver data can also represent control instructions received from a pilot of the course of a maneuver, such as control instructions received from control devices such as accelerators, brakes, steering wheels, yokes, or other control devices. In some embodiments, the plurality of first response maneuvers are based on maneuver data from at least one of a simulation of piloting a vehicle, a control system of a vehicle, or a navigation system of a vehicle.

In some embodiments, the training data includes a predetermined (or historical) first input condition and a predetermined (or historical) first response maneuver associated with the predetermined first input condition. For example, the first input condition may be stored as a first data point or set of data, and the first response maneuver stored as a second data point or set of data. As will be described with reference to FIGS. 3A-3D below, the predetermined plurality of first input conditions can indicate relative positions and relative orientations of a platform to a remote platform, such as a leader, and the predetermined plurality of first response maneuvers can indicate an angle of bank to choose to join up with the leader.

In other embodiments, the first input conditions and first response maneuvers may not be distinguished from one another when stored or when received as the training data. For example, training data received based on control of the vehicle by a pilot may be a continuous string of position data, orientation data, and/or control data. The machine learning engine 208 can be configured to parse the first input conditions and first response maneuvers from the training data, such as by executing a filter. The filter can be configured to distinguish first input conditions from first response maneuvers based on factors such as whether a command was received at the vehicle from a remote location, whether the vehicle performed a relatively abrupt maneuver such as an acceleration, turn, or deceleration, or whether the vehicle was changed from being controlled by an autopilot to being controlled manually. The machine learning engine 208 can be configured to executing a clustering algorithm to identify first input conditions and first response maneuvers from the training data, or to determine similarities between groups of first input conditions or between groups of first response maneuvers.

The machine learning engine 208 can be configured to train a learning system 256 using the training data to generate a second response maneuver based on a second input condition. The machine learning engine 208 can provide the training data as an input to the learning system 256, monitor an output of the learning system 256, and modify the learning system 256 based on the output. The machine learning engine 208 can compare the output to the plurality of first response maneuvers, determine a difference between the output and the plurality of first response maneuvers, and modify the learning system 256 based on the difference between the output and the plurality of first response maneuvers. For example, the plurality of first response maneuvers may represent a goal or objective that the machine learning engine 208 is configured to cause the learning system 256 to match, by modifying characteristics of the learning system 256 until the difference between the output and the plurality of first response maneuvers is less than a threshold difference. For example, the machine learning engine 208 can be configured to modify characteristics of the learning system 256 to minimize a cost function or optimize an objective function. The machine learning engine 208 can group the training data into a first set of training data for executing a first such learning protocol, and a second set of training data for executing a second such learning protocol.

The learning system 256 can include a learning function configured to associate the plurality of input conditions to the plurality of first response maneuvers, and the learning function can define characteristics, such as a plurality of parameters. The machine learning engine 208 can be configured to modify the plurality of parameters to decrease the difference between the output of the learning system 256 (e.g., the output of the learning function) and the plurality of first response maneuvers. Once trained, the learning system 256 can be configured to receive the second input condition and apply the learning function to the second input condition to generate the second response maneuver.

In some embodiments, the learning system 256 includes a neural network. The neural network can include a plurality of layers each including one or more nodes, such as a first layer (e.g., an input layer), a second layer (e.g., an output layer), and one or more hidden layers. The neural network can include characteristics such weights and biases associated with computations that can be performed between nodes of layers.

The machine learning engine 208 can be configured to train the neural network by providing the first input conditions to the first layer of the neural network. The neural network can generate a plurality of first outputs based on the first input conditions, such as by executing computations between nodes of the layers. The machine learning engine 208 can receive the plurality of first outputs, and modify a characteristic of the neural network to reduce a difference between the plurality of first outputs and the plurality of first response maneuvers.

In some embodiments, the learning system 256 includes a classification engine, such as a support vector machine (SVM). The SVM can be configured to generate a mapping of first input conditions to first response maneuvers. For example, the machine learning engine 208 can be configured to train the SVM to generate one or more rules configured to classify training pairs (e.g., each first input condition and its corresponding first response maneuver). The rules may include one or more hyperplanes calculated to maximize one or more corresponding margins between the hyperplanes and the training pairs, including margins defined between the hyperplanes and support vectors (e.g., those training pairs closest to the one or more hyperplanes). The classification of training pairs can enable the mapping of first input conditions to first response maneuvers by classifying particular first response maneuvers as corresponding to particular first input conditions. Once trained, the learning system 256 can generate the second response maneuver based on the second input condition by applying the mapping or classification to the second input condition.

In some embodiments, the learning system 256 includes a Markov decision process engine. The machine learning engine 208 can be configured to train the Markov decision process engine to determine a policy based on the training data, the policy indicating, representing, or resembling how a vehicle would behave while controlled by a human pilot in response to various input conditions. The machine learning engine 208 can provide the first input conditions to the Markov decision process engine as a set or plurality of states (e.g., a set or plurality of finite states). The machine learning engine 208 can provide the first response maneuvers to the Markov decision process as a set or plurality of actions (e.g., a set or plurality of finite actions). The machine learning engine 208 can execute the Markov decision process engine to determine the policy that best represents the relationship between the first input conditions and first response maneuvers.

It will be appreciated that in various embodiments, the learning system 256 can include various other machine learning engines and algorithms, as well as combinations of machine learning engines and algorithms, that can be executed to determine a relationship between the plurality of first input conditions and the plurality of first response maneuvers and thus train the learning system 256.

In some embodiments, the plurality of first response maneuvers are based on a relative navigation control model. The relative navigation control model can generate the plurality of first response maneuvers based on input conditions. For example, the relative navigation control model can receive input conditions indicating an entity state or a desired navigation goal and generate the plurality of first response maneuvers. This can allow the learning system 256 to be trained in a manner that may still approximate or resemble pilot behavior or expected vehicle behavior without requiring real world data captured from pilot behavior.

In some embodiments, the memory 254 includes a simulation engine 270. The simulation engine 270 is configured to generate a representation of an environment surrounding the vehicle (e.g., a live or simulated vehicle implementing components of the system 200). The simulation engine 270 can generate the representation of the environment based on a model of the environment. The model of the environment may indicate geographic features such as terrain or buildings. The simulation engine 270 can generate the representation of the environment to include other platforms, including simulated platforms being controlled by a human operator or constructive platforms being controlled based on a model. While FIG. 2B illustrates the memory 254 as a single entity including the machine learning engine 208 and simulation engine 270, it will be appreciated that one or more components of the memory 254 may be distributed across one or more computer-based resources. For example, the machine learning engine 208 may be included in a first memory device located in a first platform, and the simulation engine 270 can be included in a second memory device located in a second platform. The simulation engine 270 can be configured to output sensor data representative of the environment in a format configured for reception by the machine learning engine 208, the maneuver controller 212, or a perception system 216.

Referring back to FIG. 2A, in some embodiments, the system 200 includes a perception system 216 (e.g., a sensor system). The perception system 216 can include or be coupled to sensor devices such as image capture devices (e.g., cameras), infrared sensors, radar systems, or lidar systems. The perception system 216 can be configured to sample a state of a real world or real environment. In some embodiments, the perception system 216 is configured to receive a representation of the real world or real environment from the simulation engine 270 and sample the representation.

In some embodiments, such as where the vehicle the perception system 216 includes or is communicatively coupled to the simulation engine 270. The perception system 216 can compare the sampled state of the real world to a completeness constraint, such as to determine whether the sampled state provides sufficient information to inform the machine learning engine 208, maneuver controller 212, or other components of the system 200 what the environment surrounding the corresponding platform looks like. The completeness constraint can include parameters associated with sensor hardware implemented on or expected to be implemented on the vehicle. The perception system 216 can execute the simulation engine 270 to interpolate, extrapolate, or emulate gaps in the sampled state of the real world determine based on the comparison to the completeness constraint.

In some embodiments, the system includes communication electronics 224. The communication electronics 224 can include transmitter electronics, and can include receive electronics. The communication electronics 224 can include or be coupled to a datalink device. The communication electronics 224 can be configured to receive remote data, such as control instructions or indications of maneuver commands. The communication electronics 224 can be configured to transmit data regarding the system 200, such as acknowledgements of control instructions, or information regarding a vehicle implementing the system 200 or components thereof. The communication electronics 228 can be certified.

The system can include sensor devices 228. The sensor devices 228 can include one or more of an image capture device (e.g., a camera), an infrared sensor, a radar system, or a lidar system. The sensor devices 228 can be certified. The sensor devices 228 can output raw data including a plurality of pixels associated with a captured state of an environment within a sensor range of the sensor devices 228.

The system 200 can include one or more semantic translators 220. For example, as shown in FIG. 2A, the system includes a first semantic translator 220a, a second semantic translator 220b, and a third semantic translator 220c. While FIG. 2A illustrates the semantic translators 220a-c as discrete blocks, it will be appreciated that the system 200 can include a single semantic translator having dedicated functions for interaction with various other components as will be described herein for the semantic translators 220. In some embodiments, the machine learning engine 208 incorporates features of the semantic translators 220.

In some embodiments, the semantic translators 220 can act as an intermediary between raw data and the machine learning engine 208 or the maneuver controller 212, by converting raw data (e.g., sensor data) to semantic data which can be understood as an input condition. For example, the semantic translators 220 can process raw data such as images or videos of an environment surrounding the vehicle, and identify contextual information in the raw data such as the location of and distances to other entities such as geographic features or other platforms. The semantic translators 220 can process the raw data to extract indications of maneuver commands. The semantic translators 220 can process the raw data to identify behavior of other entities. For example, the semantic translators 220 can process the raw data to identify a lead aircraft and determine a maneuver being performed by the lead aircraft, such as an angle of bank. The semantic translators 220 can output the semantic data to the machine learning engine 208 or maneuver controller 212, the semantic data indicating the determined maneuver, such as by indicating the angle of bank being performed by the lead aircraft.

In some embodiments, such as when the machine learning engine 208 is being used to train the maneuver controller 212 or the learning system 256, the machine learning engine 208 can at least partially receive the training data from the semantic translators 220 as semantic training data. As such, the semantic translators 220 can perform an initial processing of raw data to convert the raw data to an appropriate level of semantic abstraction, such as by converting raw pixel data to information such as a distance to another entity; the semantic training data may further be classified according to that distance, such as by indicating that the other entity is near or far. This may improve the computational efficiency of the system 200, as the machine learning engine 208 need not necessarily have a predetermined set of rules for processing all raw data, but instead may only need to learn a relationship between semantic training data and associated response maneuvers.

In some embodiments, such as when the maneuver controller 212 has already been trained, the system 200 may not include the machine learning engine 208. Instead, the maneuver controller 212 may receive the second input conditions directly from the semantic translators 220.

In some embodiments, the semantic translators 220 are configured to transmit raw data directly to the control circuit 204. For example, the control circuit 204 (or the machine learning engine 208 or maneuver controller 212) may include an interface indicating whether the control circuit 204 is configured to receive training data as raw data, and the semantic translators 220 can determine whether to transmit the raw data to the control circuit 204 or process the raw data into semantic data prior to transmission to the control circuit 204.

The first semantic translator 220a can be configured to receive raw data (e.g., perception data, sensor data) from the perception system 216, and translate the raw data to semantic data for transmission to the control circuit 204. The second semantic translator 220b can be configured to receive raw data (e.g., communication data) from the communication electronics 224, and translate the raw data to semantic data for transmission to the control circuit 204. The third semantic translator 220c can be configured to receive raw data (e.g., sensor data) from the sensor devices 228, and translate the raw data to semantic data for transmission to the control circuit 204.

The semantic translators 220 can be configured to translate sensor data to semantic data. For example, the sensor data may be received from the perception system 216 or sensor devices 228 as an image (IR, visible, ultraviolet) or capture of a radar or lidar detector. The semantic translators 220 can be configured to execute an image recognition algorithm to identify entities in the sensor data, such as other platforms. The semantic translators can be configured to determine a distance to the other platforms. The semantic translators can be configured to classify the other platforms according to various factors, such as by executing a classification policy to determine that a platform is "near" or "far" from the platform receiving the sensor data. The semantic translators 220 can identify the entities by determining a type of the entities, such as determining a type of platform (e.g., airborne platform, ground-based platform, specific type of vehicle, lead platform, follower platform, ally platform, enemy platform).

The semantic translators 220 can be configured to output semantic data including the indication of a maneuver command based on the sensor data. For example, the semantic translators 220 can execute an image recognition algorithm on raw data to extract visual commands, such as hand gestures, movements of a platform, or electromagnetic transmissions from a platform. The semantic translators 220 can receive raw data as text data, and execute language processing algorithms to extract text commands. For example, the semantic translators can receive text data parse the text data to extract a text string such as "perform an overhead joinup," and output the semantic data to include the extracted text string. The semantic translators 220 can receive raw data as audio data, and execute a voice recognition algorithm to extract audio commands, such as to extract speech indicating a maneuver such as "perform an overhead joinup," and output the semantic data to include the extracted speech.

The semantic translators 220 can be configured to translate the raw data to semantic data based on a specification of a vehicle associated with the raw data. In some embodiments, the raw data may be hardware-dependent or otherwise specific to particular components of the vehicle. The semantic translators 220 can be configured to retrieve the specification, identify a model or function in the specification associated with the raw data, and convert the raw data to semantic data based on the model or function. For example, the raw data may be received as a voltage applied by an accelerator as a control signal to an engine. The semantic translators 220 can be configured to use the model or function to convert the voltage to an acceleration caused based on the voltage. In some embodiments, configuring the semantic translators 220 to process hardware-dependent raw data can enable the machine learning engine 208 to be hardware-independent, and thus enable the machine learning engine 208 to receive training data from a plurality of heterogeneous hardware systems.

In some embodiments, the system 200 can include a communication bus 222, such as a semantic communication bus. The communication bus 222 can be configured to receive data from components such as the perception system 216, communication electronics 224, sensor devices 228, and semantic translators 220, and transmit the received data to the control circuit 204. For example, the communication bus 222 can be configured to implement a communication protocol for converting the received data to an interface of the control circuit 204. In some embodiments, the communication bus 222 is configured to convert the received data to according to a semantic interface of the control circuit 204, such as an interface indicating a level of semantic abstraction at which the machine learning engine 208 or maneuver controller 212 is configured to receive input conditions.

The system 200 can include a failsafe controller 232. The failsafe controller 232 is configured to receive control instructions from the control circuit 204 (e.g., control instructions generated by the maneuver controller 212), and compare the control instructions to a fault condition to determine whether there is a fault in the control instructions. If the failsafe controller 232 does not determine that there is a fault in the control instructions, then the failsafe controller can transmit the control instructions to an autopilot 236 or other controller configured to control operation of a platform, such as an autonomous vehicle. If the failsafe controller 232 does determine that there is a fault in the control instructions, then the failsafe controller 232 can transmit override instructions to the autopilot 236 to avoid faulty or unsafe operation.

The system can include the autopilot 236. The autopilot 236 can be configured to generate control commands for controlling operation of the vehicle based on instructions or commands received from the control circuit 204. For example, the control circuit 204 can be configured to output the second response maneuver to the autopilot 236 (via the failsafe controller 232) as control instructions conforming to an interface of the autopilot 236.

In some embodiments, the system 200 can include an untrusted portion 202. For example, as shown in FIG. 2A, the perception system 216, semantic translators 220a-c, machine learning engine 208, and maneuver controller 212 may be included in the untrusted portion 202. The untrusted portion 202 may refer to components of the system 200 which cannot be properly certified to standards required for operation of autonomous vehicles, including unmanned aircraft. The use of certified components (e.g., trusted components) such as communication electronics 224, sensor devices 228, failsafe controller 232, and autopilot 236 can allow the components of the untrusted portion 202 to be implemented according to the inventive concepts disclosed herein even in applications required certified components, particularly for avionics applications.

In some embodiments, a vehicle can implement various components of system 200 according to the inventive concepts disclosed herein. For example, the control circuit 204 can include a first interface configured to receive the input condition, and a second interface configured to receive a control instruction indicating the maneuver command. The machine learning engine 208 may have been previously used to train the maneuver controller 212, such that the control circuit 204 can provide the input condition and the control instruction to the machine learning engine 208 or the maneuver controller 212, and in response, the machine learning engine 208 or the maneuver controller 212 can output a response maneuver based on the input condition and the control instruction. The first interface and second interface can include features of the semantic bus 222.

The control circuit 204 may then control operation of the vehicle based on the response maneuver. For example, the control circuit 204 may include or be coupled to a vehicle control system configured to control engines, wings, wheels, steering, rudders, or other control and movement mechanisms of the vehicle. The control circuit 204 can cause the vehicle to follow a path of movement based on the response maneuver. The control circuit 204 can output a control instruction to the autopilot 236 for controlling operation of the vehicle.

The input condition may be from the perception system 216 or the sensor devices 228. For example, the input condition may be received from an image capture device or a radar detector. In some embodiments, the control circuit 204 receives the input condition as raw data from the perception system 216 or sensor devices 228. In some embodiments, the vehicle includes the semantic translators 220, and the control circuit 204 can receive the input condition as semantic data from the semantic translators 220 after the semantic translators 220 convert the raw data to semantic data.

In some embodiments, the control circuit 204 can be configured for a hardware-in-the-loop implementation, such as for a testing, development, or simulation application. For example, the control circuit 204 can receive the input condition (e.g., from perception system 216), and can receive a representation of an environment from the simulation engine 270. The control circuit 204 can receive indications of maneuver commands from the communication electronics 224. The control circuit 204 can generate a response maneuver based on at least one of the input condition or the representation of the environment. The control circuit 204 can output an indication of the response maneuver, such as control instructions configured for controlling the autopilot 236. Continuing the example, the control instructions may be transmitted to the simulation engine 270, so that the simulation engine 270 may update the representation of the environment based on the control instructions. The simulation engine 270 may be configured to execute a model of how a vehicle moves when performing the response maneuver, and update the representation of the environment (including the behavior of other platforms within the environment) based on the executed model. In some embodiments, the control circuit 204 can output the control instructions to the autopilot 236, and the autopilot 236 can then generate control commands which are received by the simulation engine 270. In some embodiments, such as where the perception system 216 includes the simulation engine 270, the control circuit 204 can receive the input condition as including the representation of the environment from the perception system 216. The representation of the environment may also include representations of other platforms and other human entities, and thus the control circuit 204 can receive indications of maneuver commands via the representation of the environment, such as if the maneuver commands are generated by other platforms.

Referring now to FIGS. 3A-3D, various exemplary embodiments of training cases 300 are illustrated according to the inventive concepts disclosed herein. While the training cases 300 generally refer to response maneuvers performed in a lead/follow aircraft context, it will be appreciated that the inventive concepts disclosed with reference to FIGS. 3A-3D may be applied to any of the autonomous vehicle applications described herein.

Figure 3A:
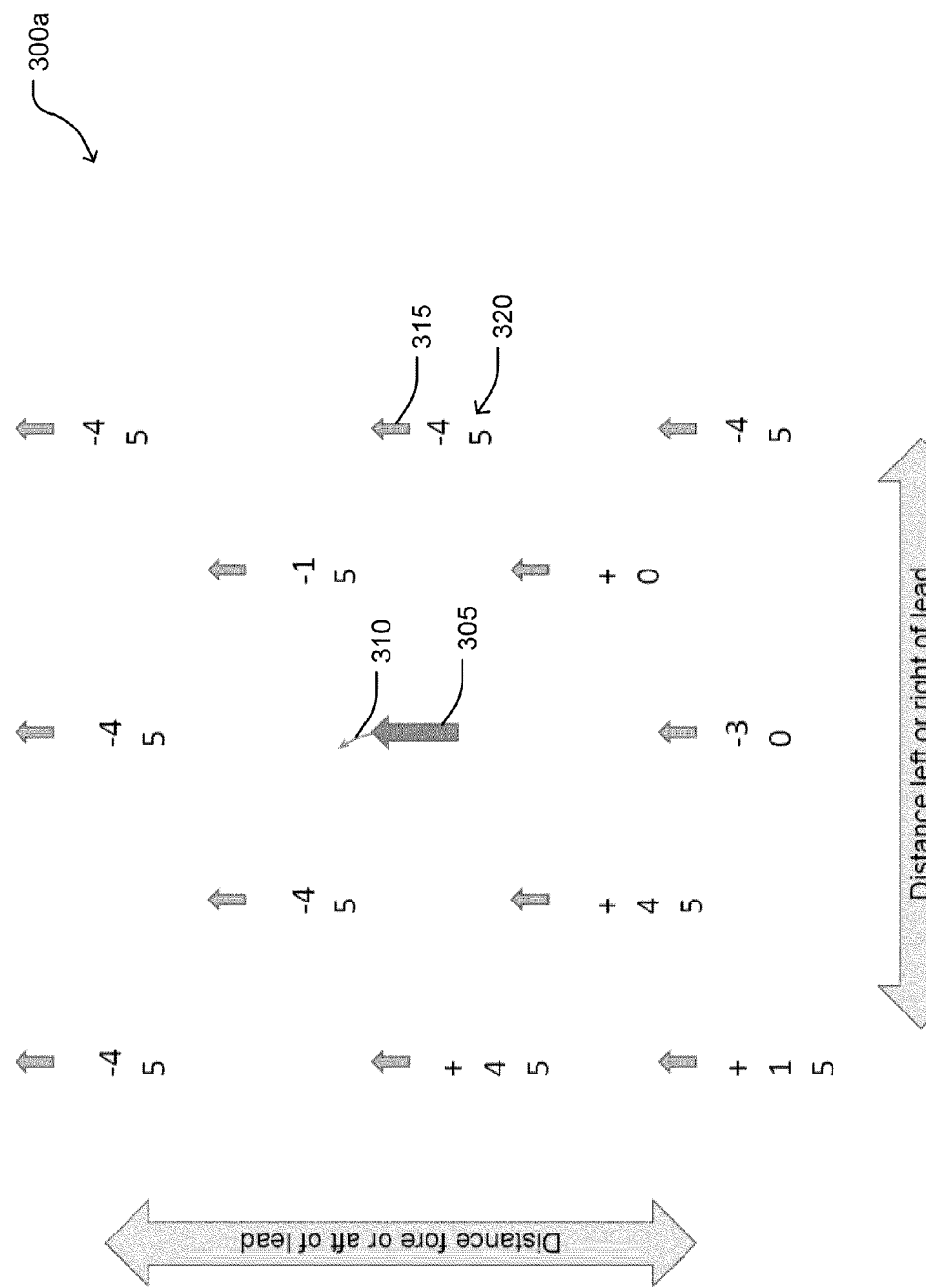

As shown in FIG. 3A, a training case 300a is shown. In the training case 300a, a lead platform 305, which may be turning in a circle according to an angle of bank 310, is positioned and oriented relative to various positions of a follower platform 315. The relative positioning includes a distance that the follower platform 315 is located fore or aft of the lead platform 305, as well as left or right of the lead platform 305. In the training case 300a, the lead platform 305 and follower platform 315 are oriented to point in the same direction. By implementing embodiments of the inventive concepts disclosed herein, the follower platform 315 can be configured to determine an appropriate response maneuver, which may be consistent with the behavior of a platform controlled by a human pilot, based on input conditions. For example, the follower platform 315 can receive or determine its input conditions to include the distance fore or aft of the lead platform 305, the distance left or right of the lead platform 305, and the behavior of the lead platform 305 (e.g., turning in a circle at a particular angle of bank). The follower platform 315 can receive an indication of a maneuver command or determine the indication of the maneuver command from the input conditions. The maneuver command may be to "perform an overhead joinup." Based on its position and orientation relative to the lead platform 305, the follower platform 315 can determine an appropriate response maneuver to perform the overhead joinup, including a power or acceleration profile and including an angle of bank 320 to be used to perform the maneuver (e.g., an angle of bank of −45 degrees), based on known or historical powers and angles of bank 320 recorded from platforms controlled by human pilots.

Figure 3C:
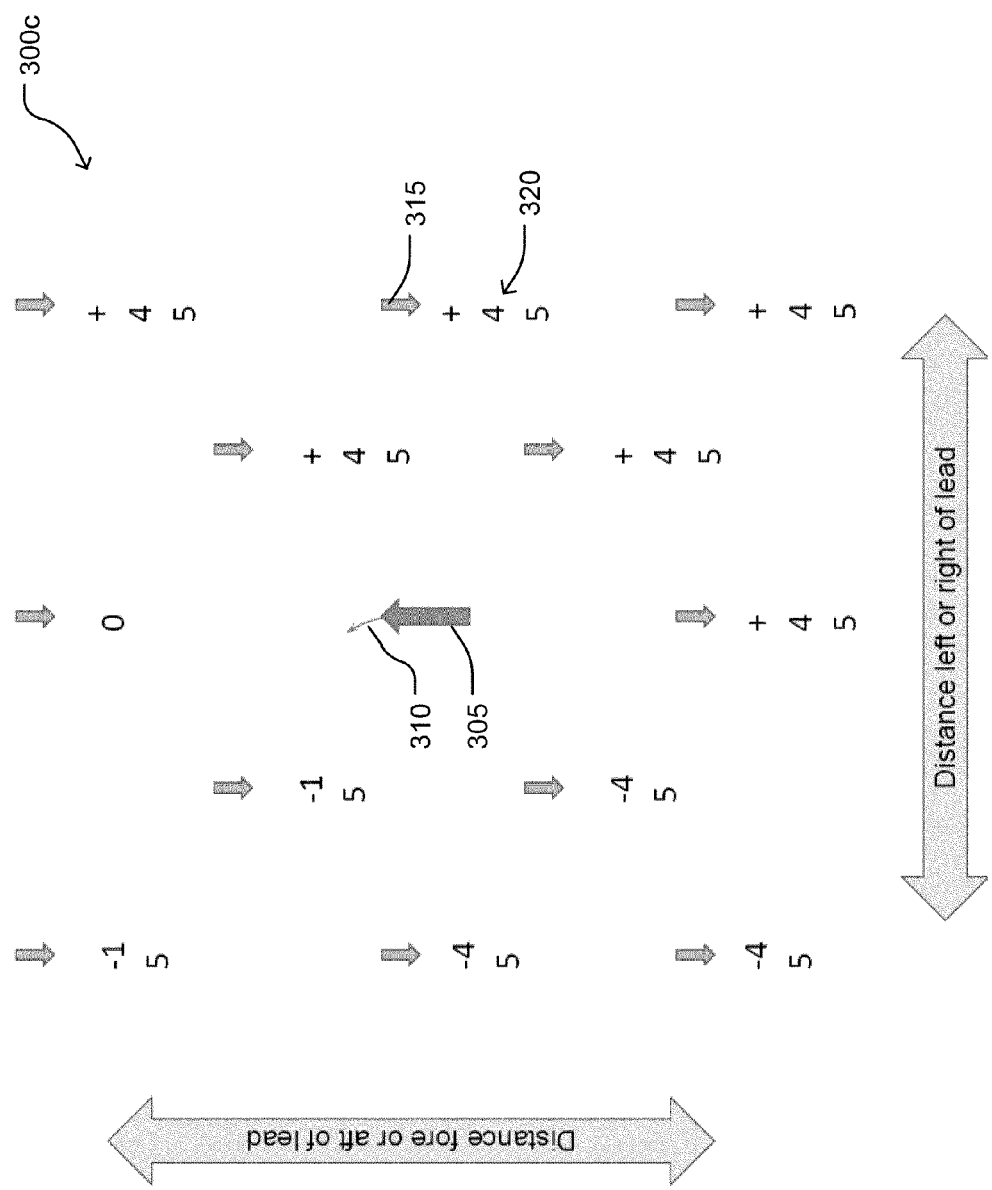
Figure 3D:
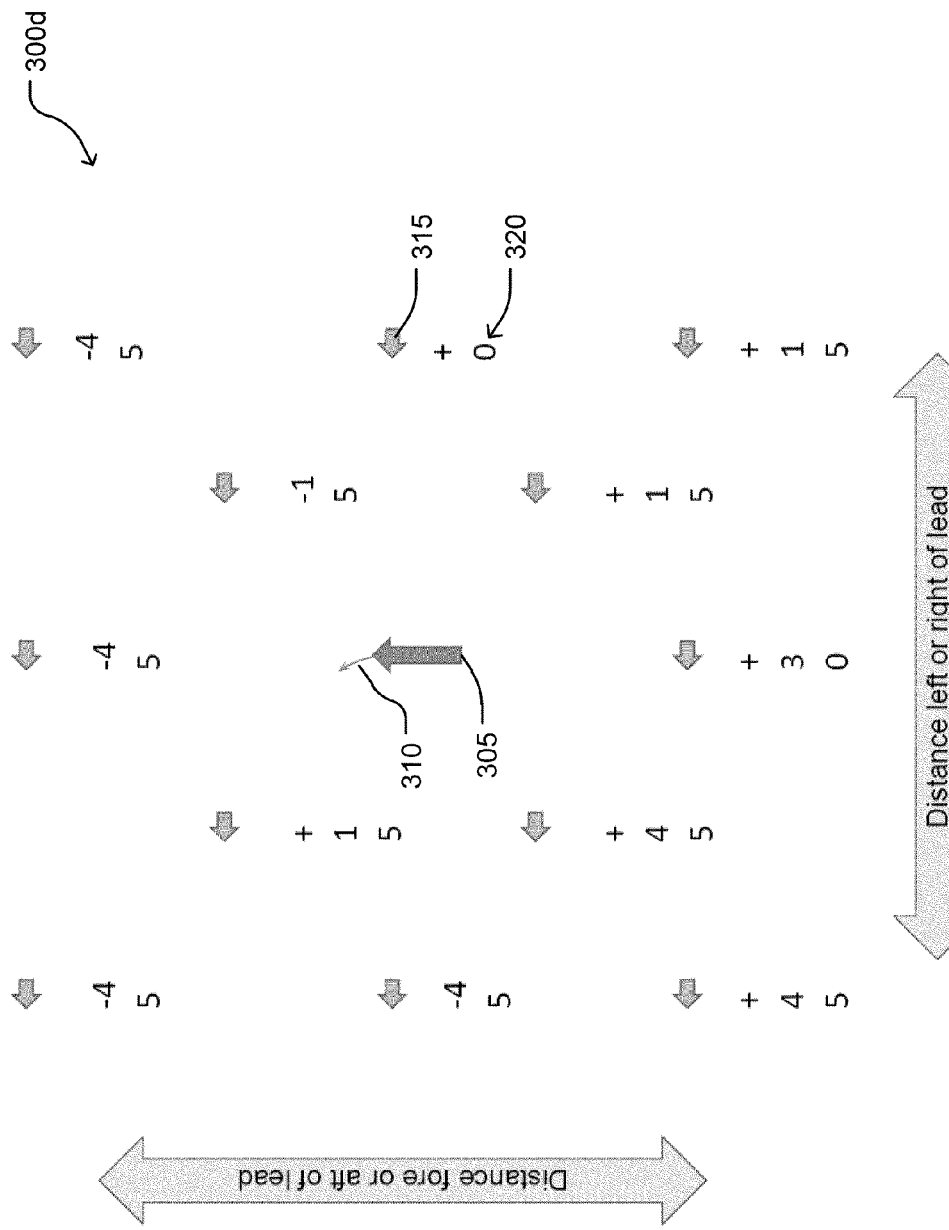

As shown in FIGS. 3B-3D, in the training cases 300b, 300c, and 300d, the follower platform 315 is oriented to face to the right of the lead platform 305, the opposite direction as the lead platform 305, and to the left of the lead platform 305. The follower platform 315 can thus be trained to perform response maneuvers that account for varied conditions, including changes in orientation relative to the lead platform 305. As each of the training cases 300a-300d is generated based on data recorded from simulations or real flight data of platforms controlled by a pilot, the follower platform 315 can learn how to perform response maneuvers in a similar manner to platforms controlled by human pilots.

Figure 4:
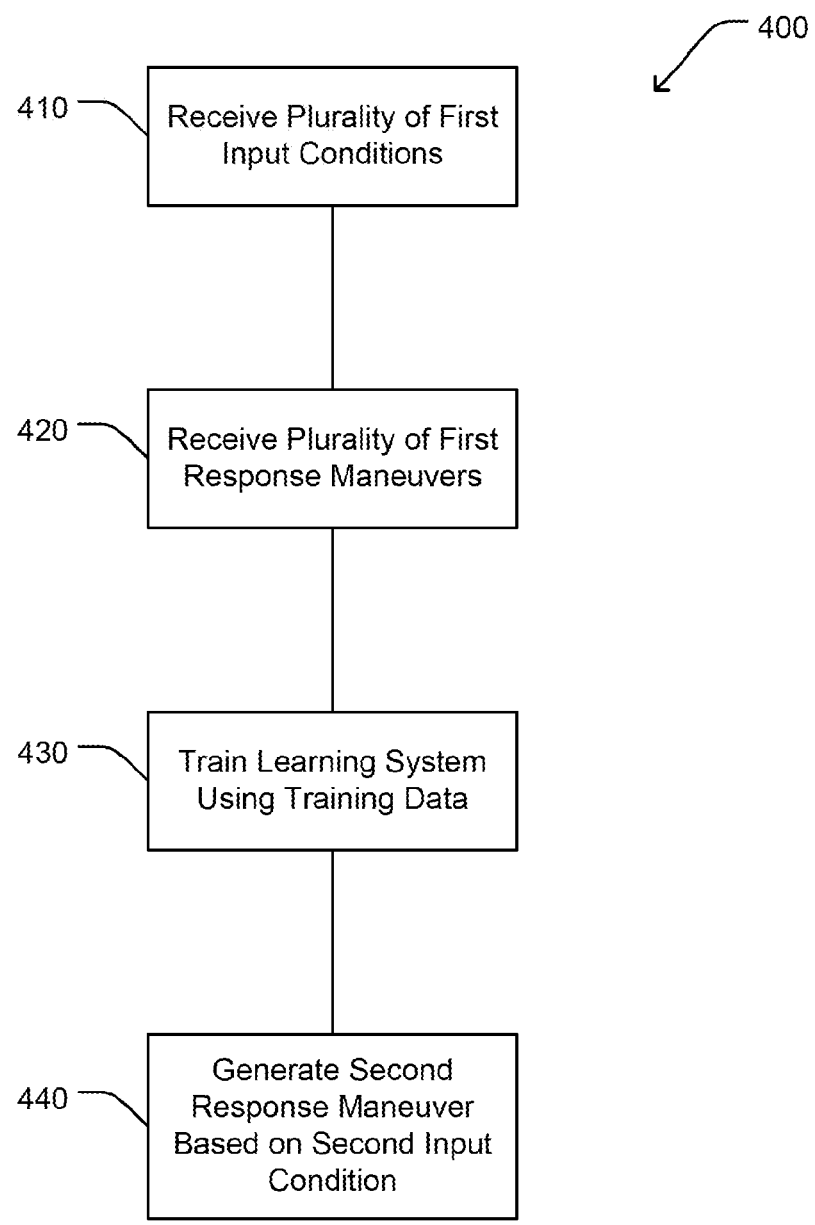
FIG. 4 is a diagram of an exemplary embodiment of a method according to the inventive concepts disclosed herein.

Referring now to FIG. 4, an exemplary embodiment of a method 400 according to the inventive concepts disclosed herein may include the following steps. The method 400 may be performed using various hardware, apparatuses, and systems disclosed herein, such as the aircraft control center 10, the system 200, the processing circuit 250, and/or components thereof.

A step (410) may receiving a plurality of first input conditions. Each first input condition can include an indication of a maneuver command and an entity state. The entity state can include at least one of a position, a velocity, an acceleration, or an orientation. The indication of the maneuver command can include at least one of an audio command, a visual command, a text command, or a command received via a datalink. The visual command can include at least one of a hand gesture, a movement of a platform, or an electromagnetic transmission from a platform.

A step (420) may include receiving a plurality of first response maneuvers. The plurality of first response maneuvers may be based on a relative navigation control model. The plurality of first response maneuvers may be based on maneuver data from at least one of a simulation of piloting a vehicle, a control system of a vehicle, or a navigation system of a vehicle. For example, the maneuver data may be recorded movement of a vehicle when controlled by a human pilot.

A step (430) may include training, by a machine learning engine, a learning system using the training data. Training the learning system may include modifying or updating the learning system to be able to generate outputs that are similar to the plurality of first response maneuvers when the learning system receives the plurality of first input conditions as inputs. In some embodiments, the learning system includes at least one of a neural network, a SVM, or a Markov decision process engine.

A step (440) may include generating a second response maneuver based on a second input condition. For example, the trained learning system can receive the second input condition as an input, and generate the second response maneuver based on the received second input condition. The trained learning system can output the second response maneuver as control instructions, such as for controlling operation of a platform.

Figure 5:
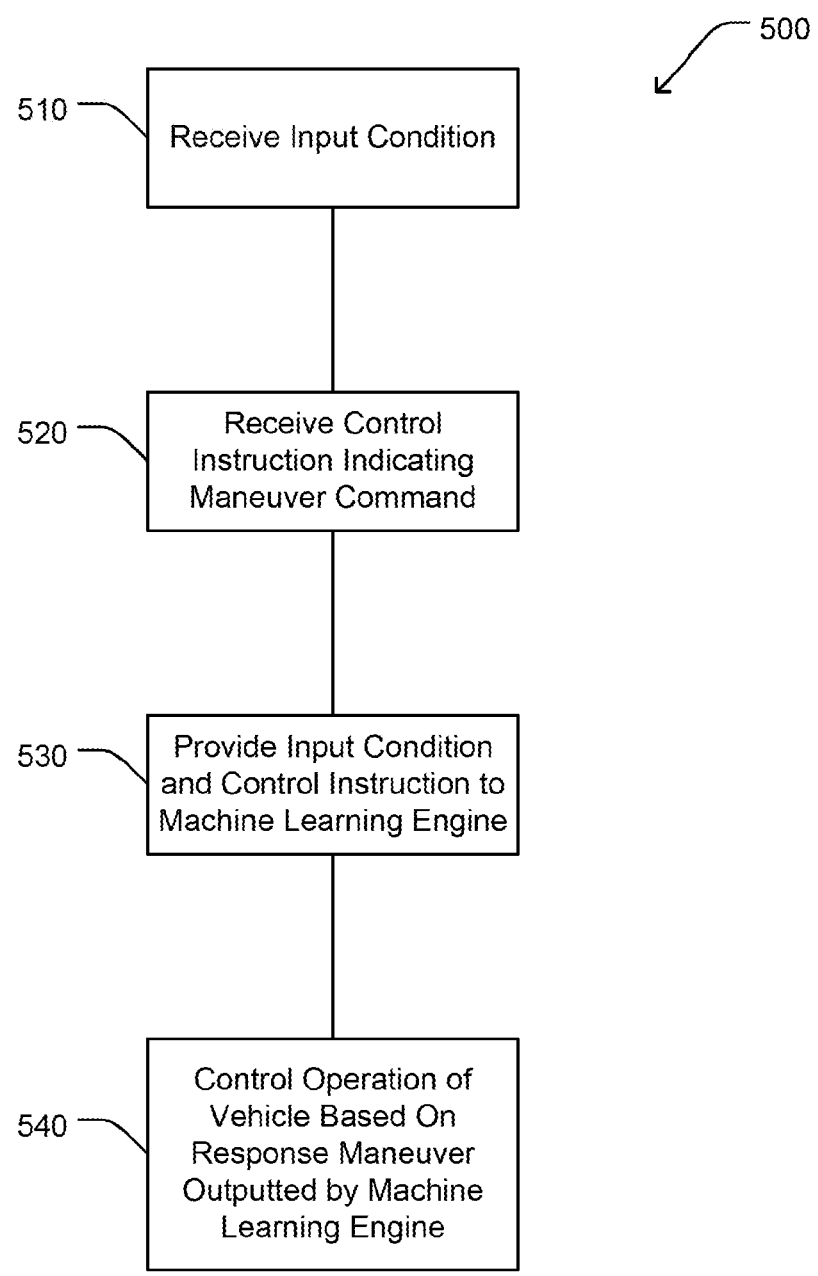
FIG. 5 is a diagram of an exemplary embodiment of another method according to the inventive concepts disclosed herein.

Referring now to FIG. 5, an exemplary embodiment of a method 500 according to the inventive concepts disclosed herein may include the following steps. The method 500 may be performed using various hardware, apparatuses, and systems disclosed herein, such as the aircraft control center 10, the system 200, the processing circuit 250, and/or components thereof.

A step (510) may include receiving an input condition. The input condition can be received from at least one of an image capture device, a radar detector, or a navigation system. The input condition can include a relative orientation based on at least one remote vehicle. A step (520) may include receiving a control instruction indicating a maneuver command.

A step (530) may include providing the input condition and control instruction to a machine learning engine, or to a learning system trained by a machine learning engine. The machine learning engine can be configured to output a response maneuver based on the input condition and the control instruction. For example, the response maneuver can indicate control commands for control operation of a vehicle, such as controlling movement of the vehicle. The learning system can be configured to be trained based on a plurality of predetermined input conditions and a plurality of predetermined response maneuvers associated with the plurality of predetermined input conditions. The learning system can include at least one of a neural network, a SVM, or a Markov decision process engine.

A step (540) may include controlling operation of the vehicle based on the response maneuver. For example, a control system or autopilot of the vehicle can be controlled to operate the vehicle based on the response maneuver. The vehicle can be controlled to follow a path of movement.

Figure 6:
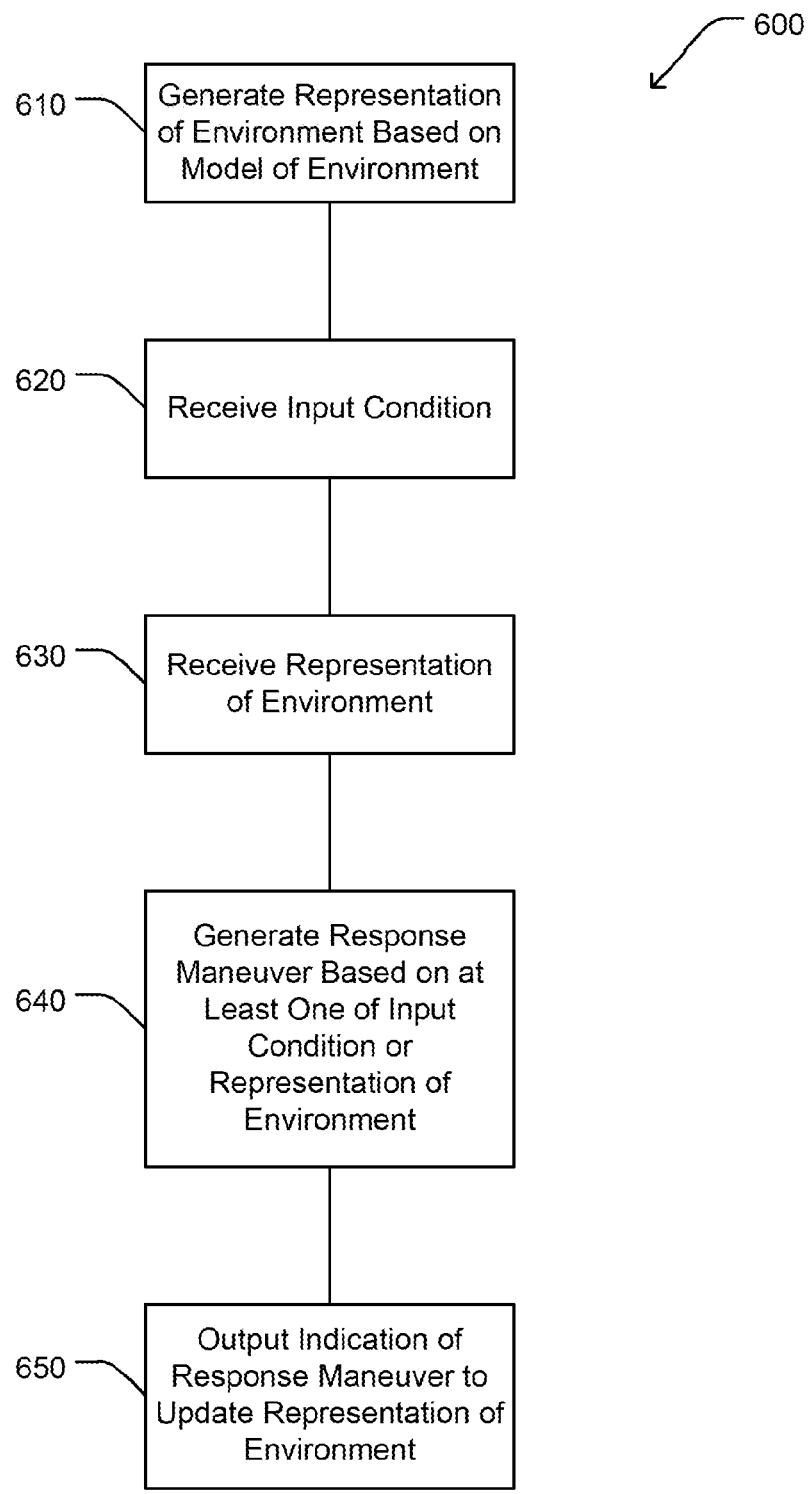
FIG. 6 is a diagram of an exemplary embodiment of another method according to the inventive concepts disclosed herein.

Referring now to FIG. 6, an exemplary embodiment of a method 600 according to the inventive concepts disclosed herein may include the following steps. The method 600 may be performed using various hardware, apparatuses, and systems disclosed herein, such as the aircraft control center 10, the system 200, the processing circuit 250, and/or components thereof.

A step (610) may include generating a representation of an environment based on a model of the environment, such as by a simulation engine. Generating the representation of the environment may include generating geographic features such as terrain, as well as buildings and platforms. The representation may be generated to conform to a sensory interface of a platform.

A step (620) may include receiving an input condition. The input condition can be received from a perception system. The input condition can be received from at least one of an image capture device, a radar detector, or a navigation system. The input condition can include a relative orientation based on at least one remote vehicle. A step (630) may include receiving the representation of the environment.

A step (640) may include generating a response maneuver based on at least one of the input condition or the representation of the environment. The response maneuver can indicate control commands for control operation of a vehicle, such as controlling movement of the vehicle. A learning system can be configured to be trained based on a plurality of historical input conditions and a plurality of historical response maneuvers associated with the plurality of historical input conditions in order to generate the response maneuver.

A step (650) can include outputting an indication of the response maneuver to update the representation of the environment. For example, the response maneuver can be outputted as control commands for controlling operation of the vehicle. The simulation engine can receive the control commands and update a representation of the vehicle in the representation of the environment, including updating behavior of other simulated platforms in the representation of the environment.

As will be appreciated from the above, systems and methods for an avionics graphics interface according to embodiments of the inventive concepts disclosed herein may improve operation of autonomous vehicles, including control systems and electronics of autonomous vehicles, by enabling autonomous vehicles to provide a shared mental model at a high level of semantic understanding to a human operator, and to perform maneuvers in a manner consistent with how a vehicle controlled by a human operator would behave.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
    a machine learning engine configured to:
        receive training data including a plurality of first input conditions and a plurality of first response maneuvers associated with the first input conditions; and
        train a learning system using the training data to generate a second response maneuver based on a second input condition using a learning function including at least one learning parameter, wherein training the learning system includes:
            providing the training data as an input to the learning function, the learning function configured to use the at least one learning parameter to generate an output based on the input;
            causing the learning function to generate the output based on the input;
            comparing the output to the plurality of first response maneuvers to determine a difference between the output and the plurality of first response maneuvers; and
            modifying the at least one learning parameter to decrease the difference responsive to the difference being greater than a threshold difference.

2. The system of claim 1, wherein the learning system includes at least one of a neural network, a support vector machine, or a Markov decision process engine.

3. The system of claim 2, wherein the machine learning engine is configured to train the neural network by providing the first input conditions as the input to a first layer of the neural network, wherein the output generated by the learning function includes a plurality of first outputs from the neural network generated based on the first input conditions, and the at least one learning parameter includes a characteristic of the neural network which is modified to reduce a difference between the plurality of first outputs and the plurality of first response maneuvers.

4. The system of claim 1, wherein each first input condition includes an indication of a maneuver command and an entity state.

5. The system of claim 4, wherein the entity state includes at least one of a position, a velocity, an acceleration, or an orientation.

6. The system of claim 5, wherein the indication of the maneuver command includes at least one of an audio command, a visual command, a text command, or a command received via a datalink.

7. The system of claim 6, wherein the visual command includes at least one of a hand gesture, a movement of a platform, or an electromagnetic transmission from a platform.

8. The system of claim 1, wherein the plurality of first response maneuvers are based on a relative navigation control model.

9. The system of claim 1, wherein the plurality of first response maneuvers are based on maneuver data from at least one of a simulation of piloting a vehicle, a control system of a vehicle, or a navigation system of a vehicle.

10. The system of claim 1, further comprising a sensor system configured to receive sensor data and generate the second input condition based on the sensor data.

11. A vehicle, comprising:
    a first interface configured to receive an input condition;
    a second interface configured to receive a control instruction indicating a maneuver command; and
    a control circuit including a machine learning engine, the machine learning engine including a learning system trained by:
        providing training data as an input to a learning function, the training data including a plurality of predetermined conditions associated with a plurality of predetermined response maneuvers, the learning function configured to use the at least one learning parameter to generate an output based on the input;
        generating the output based on the input using the learning function;
        comparing the output to the plurality of predetermined response maneuvers to determine a difference between the output and the plurality of predetermined response maneuvers; and
        modifying the at least one learning parameter to decrease the difference responsive to the difference being greater than a threshold difference;
    the control circuit configured to:
        provide the input condition and control instruction to the machine learning engine, the machine learning engine configured to use the trained learning system to output a response maneuver based on the input condition and the control instruction; and
        control operation of the vehicle based on the response maneuver.

12. The vehicle of claim 11, wherein the input condition is received from at least one of an image capture device, a radar detector, or a navigation system.

13. The vehicle of claim 12, wherein the input condition includes a relative orientation based on at least one remote vehicle.

14. The vehicle of claim 11, wherein the learning system includes at least one of a neural network, a support vector machine, or a Markov decision process engine.

15. The vehicle of claim 11, wherein the vehicle further comprises an autopilot system, and the control circuit is configured to control operation of the vehicle using the autopilot system.

16. The vehicle of claim 11, wherein the response maneuver is configured to cause the vehicle to follow a path of movement.

17. A system, comprising:
    a simulation engine configured to generate a representation of an environment based on a model of the environment; and
    a control circuit configured to:
        receive an input condition;
        receive the representation of the environment from the simulation engine;
        generate a response maneuver based on at least one of the input condition or the representation of the environment, the response maneuver generated using a maneuver controller including a machine learning engine trained by:
  providing training data as an input to the machine learning engine, the training data including a plurality of historical conditions associated with a plurality of historical response maneuvers, the machine learning engine configured to use the at least one learning parameter to generate an output based on the input;
  generating the output based on the input using the machine learning engine;
  comparing the output to the plurality of historical response maneuvers to determine a difference between the output and the plurality of historical response maneuvers; and
  modifying the at least one learning parameter to decrease the difference responsive to the difference being greater than a threshold difference; and
output an indication of the response maneuver to the simulation engine to cause the simulation engine to update the representation of the environment.

18. The system of claim 17, wherein the control circuit is configured to receive the input condition from a perception system.

* * * * *